United States Patent [19]
Calcagno et al.

[11] 3,958,086
[45] May 18, 1976

[54] TELEPHONE-SIGNAL RECEIVER FOR SWITCHING EXCHANGES HAVING CENTRALIZED LOGIC CIRCUITS

[75] Inventors: Piero Calcagno, Collegno (Turin); Enzo Garetti, Turin, both of Italy

[73] Assignee: CSELT - Centro Studi e Laboratori Telecommunicazioni SpA, Turin, Italy

[22] Filed: Oct. 22, 1974

[21] Appl. No.: 517,017

[30] Foreign Application Priority Data
Oct. 22, 1973 Italy.................................. 70090/73

[52] U.S. Cl........................... 179/15 BY; 179/18 EB
[51] Int. Cl.².......................................... H04M 3/22
[58] Field of Search......... 179/15 A, 15 AT, 15 BY, 179/15 BA, 18 J, 18 EB

[56] References Cited
UNITED STATES PATENTS

| | | | |
|---|---|---|---|
| 3,710,028 | 1/1973 | Pitroda............................ | 179/15 BY |
| 3,801,746 | 7/1972 | Buchner.......................... | 179/15 AT |
| 3,824,349 | 7/1974 | Buchner.......................... | 179/15 BY |
| 3,859,467 | 1/1975 | Borgström....................... | 170/15 BY |
| 3,870,826 | 3/1975 | Carbrey........................... | 179/18 J |

*Primary Examiner*—David L. Stewart
*Attorney, Agent, or Firm*—Karl F. Ross; Herbert Dubno

[57] ABSTRACT

Switching criteria are transmitted over a plurality of trunk lines to a central office of a telecommunication system in the form of a set of binary signals modulated on three carriers for each trunk line, the triads of carriers being cyclically sampled and demodulated. During each sampling interval $t_i$ allocated to a particular trunk $G_i$ within a cycle, a locally generated identification code of that trunk is transmitted to each of three sections of a read-only memory MS, each memory section permanently storing four different threshold values for the length of "on" signals (1) and "off" signals (0). Integrators IN, rejecting spurious changeovers from one type of signal to the other, feed respective counters CT via respective coincidence circuits CFR which receive from a register MG the bits of the preceding cycle and reset arithmetic units $\sigma$ in these counters whenever there is a definite change in the type of signal received; each counter CT, emitting a count which increases by 1 in each new cycle, is maintained at its maximum count (unless previously reset) as long as no change occurs. The count of each counter is compared with the several threshold values, stored in the associated memory section, in a corresponding section of a comparator CMP whose output is delivered to a processor AC.

7 Claims, 6 Drawing Figures

TELEPHONE-SIGNAL RECEIVER FOR SWITCHING EXCHANGES HAVING CENTRALIZED LOGIC CIRCUITS

FIELD OF THE INVENTION

Our present invention relates to a signal receiver for an electronic switching exchange or central office of a telecommunication system having centralized logic circuits for the monitoring of signals appearing on its associated line links, the signals being sampled in digital form before being sent to control units in a processor.

BACKGROUND OF THE INVENTION

It is well known that any telephone exchange requires a preliminary verification of the incoming signals in order to eliminate spurious signals and to send only properly encoded signals to the control units designed to identify the signaling criteria.

In conventional electromechanical exchanges, such verification is carried out by groups of circuits, referred to as translators, which are associated with each trunk. In the large modern exchanges, where the ever-increasing requirements for new services call for the use of either more and more complex signaling codes or more and more sophisticated connection and supervision procedures, the individual assignment of a translator to each trunk would require an excessive number of translators, giving rise to space and cost problems during installation and operation.

A first step in the solution of the problem was made in the register exchanges, through the utilization of ancillary centralized logical circuitry carrying out some of the logic functions of the translators.

Recently, the decision and control units have been increasingly centralized and the higher speed of the electronic systems has been exploited through the use of time-division techniques; consequently the centralized electronic units were also assigned functions which had been handled by peripheral equipment in the earlier exchanges, thus leaving only some essential functions decentralized.

In the most modern highly centralized electronic exchanges, the traditional translators are replaced by simple circuits scanning the trunks and sampling the signals appearing thereon.

OBJECTS OF THE INVENTION

The general object of our present invention is to provide an improved signal receiver for a highly centralized telephone exchange of simplified structure and more dependable operation compared with other such systems.

A more particular object of our invention is to provide means for carrying out signal identification at a very high speed, variable from 2 to 60 Mbit/s, depending on the input-signal parallelism.

Another object is to increase the versatility of such a signal receiver, allowing it to operate with different signaling codes and for a variety of services.

A further object of the present invention is to provide means for supplying the control units with highly detailed and accurate information on the received signals.

SUMMARY OF THE INVENTION

In a central office embodying our present invention, in which each incoming line (referred to hereinafter as a trunk) is constituted by a plurality of channels carrying binary switching criteria which are represented by alternating binary channel conditions referred to hereinafter as "1" (on) and "0" (off), a first register controlled by a timer successively reads out the identification codes of these trunks during respective sampling intervals within a recurrent sampling cycle. The timer also controls a decoder which is connected to the incoming lines for generating a bit 1 or 0 for each channel of a trunk during the sampling interval allocated to that trunk, the bit being stored in a second register for the duration of a sampling cycle. A memory is controlled by the timer to give out threshold values for the minimum length of the binary channel conditions which are stored therein for each channel and delivering them to a comparator during an interval in which the corresponding channels are being sampled. A coincidence circuit connected to the decoder and to the second register determines the identity of nonidentity of a stored bit from a preceding cycle with a newly generated bit, this circuit controlling a counter individual to each channel which produces a progressively increasing count until reset by a nonidentity signal. The counter works into the aforementioned comparator which, during each sampling interval, compares its count with the threshold value or values given out by the memory and reports the result to the processor of the central office.

BRIEF DESCRIPTION OF THE DRAWING

These and other features of our invention will become more readily apparent from the following description of an embodiment thereof given, by way of example and not in a limiting sense, in conjunction with the accompanying drawing in which.

SPECIFIC DESCRIPTION

Figure 1:
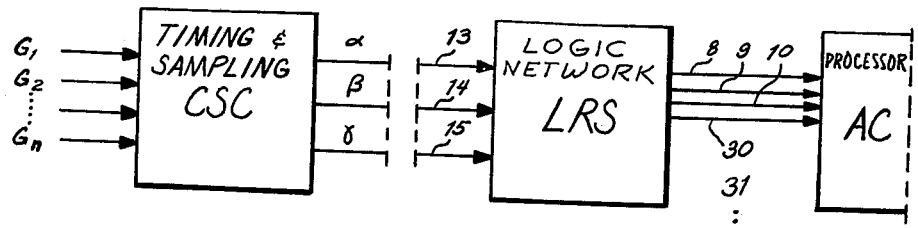
FIG. 1 is an overall block diagram of a signal-receiving unit of a telephone exchange according to our invention.

In FIG. 1, CSC indicates the set of timing circuits scanning and sampling the signals arriving over $n$ trunks G1, G2, ... G$n$ processed by the exchange. Unit CSC scans cyclically the state of the usual triad of wires $a, b, c$ (not shown) of these trunks, the samples appearing on a corresponding triad of output leads $\alpha, \beta, \gamma$ which are representative of carriers modulated by these signals; the signal samples present on the $n$ wires $a$ are cyclically transmitted over lead $\alpha$, the signal samples present on the $n$ wires $b$ are cyclically transmitted over lead $\beta$ and the signal samples present on the $n$ wires $c$ are cyclically transmitted over lead $\gamma$. The sequence of the $n$ samples on leads $\alpha, \beta, \gamma$ is invariable, i.e. each incoming trunk corresponds to a predetermined sampling interval during which the conditions of its three channels $a, b, c$ will constitute the output signals on leads $\alpha, \beta, \gamma$ of unit CSC. Within that unit, a trunk code corresponds to the time position allocated to each of the *n* trunks and therefore to a respective sampling interval.

A logic network LRS serves for the verification of the signals, in accordance with the present invention, and will be described in detail with reference to FIG. 2; at AC we have indicated a processor or control unit which, from the verified signals, determines the switching criteria and, depending on them, decides either on the sending of further criteria or on the performance of the supervisory operations as is well known per se.

Figure 2:
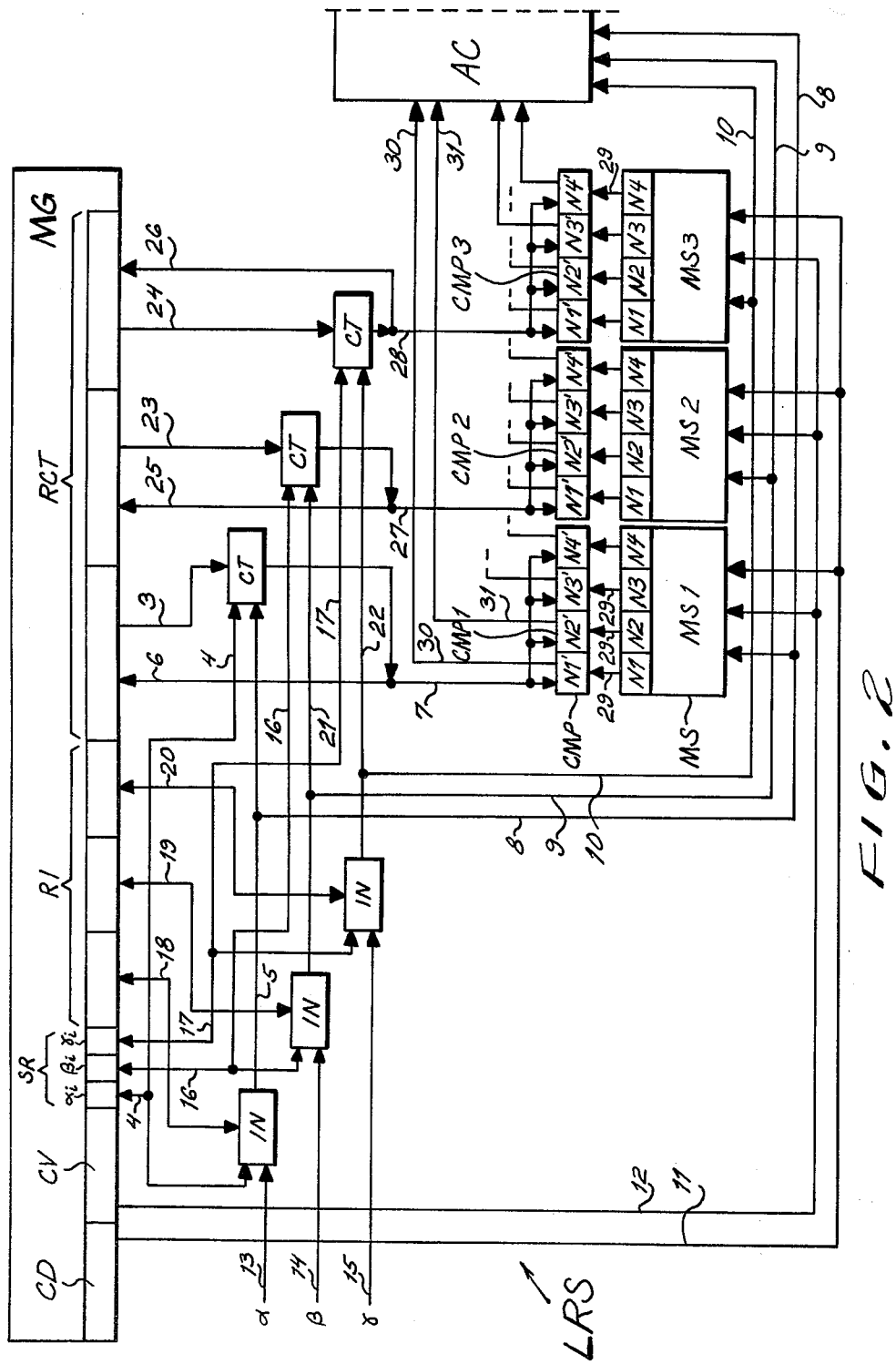
FIG. 2 is a detailed block diagram of the unit denoted by LRS in FIG. 1.

FIG. 2 shows a trunk memory of conventional type designed to store the state of sequential logic circuits IN, described hereinafter, which operate on the input signals received in each sampling interval. This allows the time-division processing of the signals received from a multiplicity of trunks, avoiding the need for a memory circuit for each trunk. The results stored in memory MG are recalled by the logic circuits during the next sampling cycle.

Figure 3:
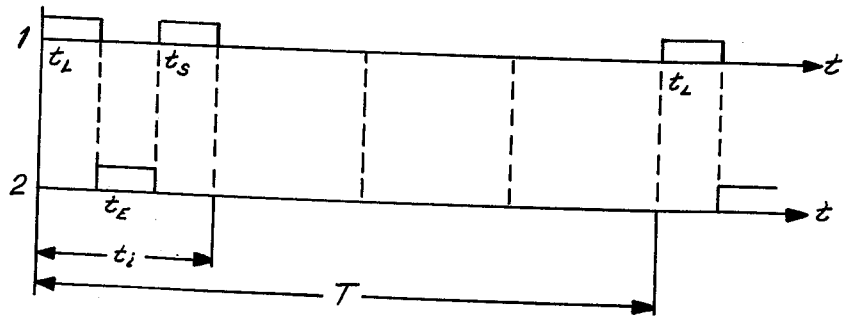
FIG. 3 is a time diagram relating to the operation of the unit shown in FIG. 2.

This mode of operation is clearly shown in the diagram of FIG. 3 where T indicates the length of a sampling cycle for all the trunks, which may be for example 4 ms; $t_i$ indicates the processing time for any single sample, thus the sampling interval allocated to each trunk, equaling the period T of a sampling cycle divided by the number of the scanned trunks, i.e. $t_i = T/n$. During each interval $t_i$ the following sequential operations are carried out:

1. reading in the trunk memory MG (as plotted on an abscissa axis 1) the stored address code of any trunk G$i$, such a reading occurring during a short time slot $t_L$ which is the memory-accesss time;

2. processing in the calculation circuits (as plotted on an abscissa axis 2) the signal samples $\alpha_i, \beta_i, \gamma_i$ obtained from the trunk G$i$ identified by the address code read during the interval $t_L$, this processing taking place during a short time slot $t_E$; and 3. writing in the trunk memory MG (axis 1) the result of the operation just carried out, during a short time slot $t_S$.

It is clear that $$t_L + t_E + t_S = t_i.$$

When all the trunks are scanned, trunk G$i$ will be scanned again after a period T and the three aforedescribed operations will be repeated.

Memory MG (FIG. 2) contains a number of memory words equal to the number of trunks to be processed and is addressed by the above-mentioned trunk code, associated with the incoming data samples. This address is locally generated because, as previously said, the succession of the incoming samples is strictly sequential. One such memory word is symbolically represented in FIG. 2 within a first register represented by the left-hand portion of memory MG. This word consists of a first group of bits CD indicating the signaling code of the identified trunk; a second group of bits CV indicating a possible modification of this code, e.g. on account of particular adaptations peculiar to the exchange here considered; a third group of bits SR containing the stored samples $\alpha_i, \beta_i, \gamma_i$ processed in the previous operating cycle; a fourth group of bits RI indicating the result of the calculation operations carried out by integrating or decoding units IN described hereinafter; and a fifth group of bits RCT indicating the results of the calculation operations carried out by counting units CT also described hereinafter. The last-mentioned group RCT is stored in the right-hand portion of memory MG constituting a second register.

Integrators IN serve to reject the spurious signals as discussed in detail below with reference to FIG. 4.

Counters CT measure the duration of the incoming pulses and register a count representing the digital equivalent of that duration. These counters are of a particular type described hereinafter with reference to FIG. 5.

A conventional read-only memory MS can be externally loaded and reprogrammed, when necessary, by well-known techniques. This memory consists of three identical sections MS1, MS2, MS3; section MS1 receives signals from lead $\alpha$, section MS2 receives signals from lead $\beta$ and section MS3 receives signals from lead $\gamma$. The memory sections MS1, MS2 and MS3 have a structure described hereinafter in detail with reference to FIG. 6.

At CMP we have indicated a set of conventional logic comparators of binary configuration, producing an output signal "1" when the binary number to be checked is equal to or greater than a reference number chosen as a comparison threshold.

Figure 4:
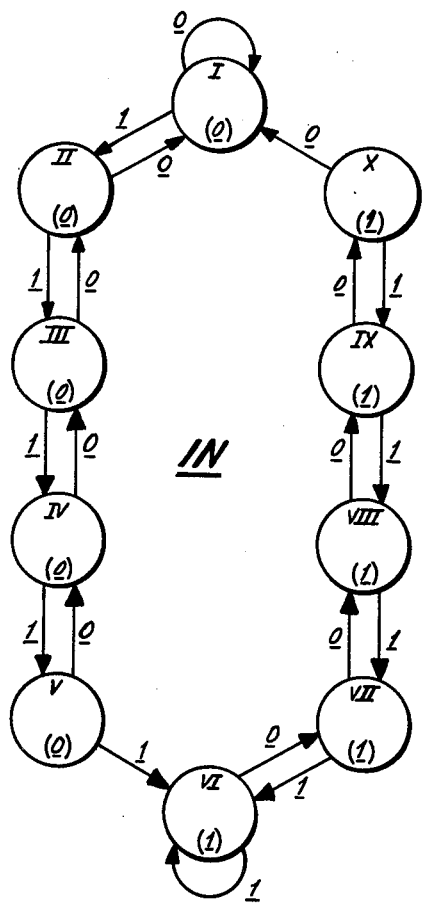
FIG. 4 is a flow chart explaining the operation of the units denoted by IN in FIG. 2.

FIG. 4 shows schematically, in the form of a flow chart, the operation of an integrator IN which, structurally, can be a simple read-only memory addressable by the totality of the incoming signals. The Roman numbers I, II, . . . X within the circles of the flow chart indicate the succession of the integrator states, read in section R1 of memory MG (FIG. 2), and the numbers in parentheses (FIG. 4) indicate the integrator output. On the transition lines between the states, an arrow labeled 1 indicates the forward transition occurring when the lead $\alpha$, $\beta$ or $\gamma$ associated with this particular integrator carries an input signal "1", whereas an arrow labeled 0 indicates the retrogression occurring when that signal is "0". Thus, let us assume that at the beginning the circuit is in its stable state I with output 0; the arrival of a "0" does not cause any changeover to a transitory or unstable state (in FIG. 4 this is symbolized by an arrow 0 turning in on itself). The appearance of a "1" causes the transition to an unstable state II. When the circuit is in any unstable state II, III, IV, V, the arrival of a "1" causes a counterclockwise transition to the state of next-higher rank whereas the reception of a "0" causes a clockwise transition to the previous, lower-ranking state; in both cases the output is 0. From state II after a succession, for example, of two signals "1" and one signal "0", state III is reached with an output 0, after an intermediate transition to state IV. when the stable state VI is reached, e.g. after a continuous succession of five signals "1" starting from state I, a 1 is emitted and the pattern of the states becomes the dual of the previous one; thus, the reception of a signal "1" does not bring about any change from state VI, whereas the arrival of a signal "0" brings about the transition from state VI to state VII, retaining the output 1. When the circuit is in any unstable state VII, VIII, IX, X, the arrival of a signal "0" causes a counterclockwise advance to the next state whereas the appearance of a signal "1" causes a clockwise retrogression to the previous state: in both cases the output is 1. Such a program bases a decision for a 1 or a 0 upon a preponderance of incoming samples of a corresponding type exceeding by at least five the number of incoming signals of the other type; this eliminates interferences from short-term disturbances which could lead to decoding errors. The described program may be modified, with a higher or lower degree of sensitivity, by using a reduced or an expanded cycle, respectively.

Figure 5:
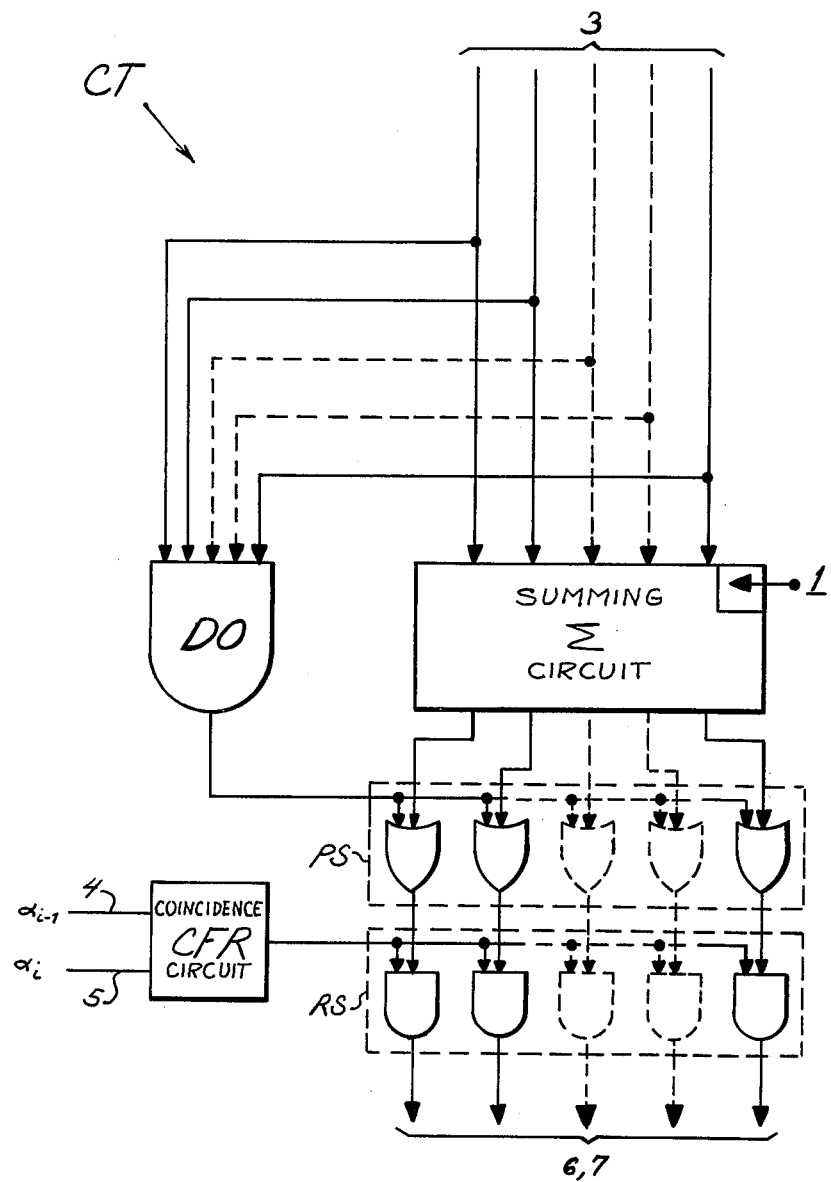
FIG. 5 is a detailed diagram of the units denoted by CT in FIG. 2.

In FIG. 5, showing details of one of the three counters CT, the reference numbers for the various input and output connections are those associated in FIG. 2 with the counter served by lead $\alpha$. At $\sigma$ we have illustrated a conventional binary summing circuit designed to add a "1" to any binary number fed in on an input multiple 3; an AND gate DO has its inputs connected to the wires of multiple 3 and works into a plurality of OR gates PS which lie in cascade with respective AND gate RS. A conventional coincidence circuit CFR, distinct from counter CT but not illustrated separately in FIG. 2, unblocks the AND gates RS if equal signals are present at its inputs; otherwise it has no output. The binary number appearing on the multiple 3 represents, as described hereinafter, the counter state at the end of the previous calculation cycle; tthe incremented number transverses the gates PS and, as long as no all-1 code configuration has reached the wires 3, is transferred to gates RS. The input signals of coincidence circuit CFR, received on wires 4 and 5, are respectively, as will be seen hereinafter, the integrated signal $\alpha_i$ to be currently processed and the corresponding signal $\alpha_{i-1}$ of the previous calculation cycle. The gates RS have output leads forming a pair of multiples 6 and 7 (cf. FIG. 2). If none of these gates conducts, owing to the absence of a match between the signals $\alpha_i$ and $\alpha_{i-1}$ in the inputs of coincidence circuit CFR, the resulting recirculation of an all-0 code word via output multiple 6, "second register" section RCT of memory MG and input multiple 3 to the arithmetic unit $\sigma$ constitutes a zeroizing of the counter which restarts its count with the detection of the next pair of matching samples by circuit CFR.

When an all-1 code configuration is present on wires 3, corresponding to a full-capacity count of unit $\sigma$, gate DO emits a signal "1" to the left-hand inputs of gates PS whose right-hand inputs receive at this time an all-0 code configuration because of the incrementing effect of arithmetic unit $\sigma$. As long as the signal coincidence lasts on inputs 4 and 5, wires 6, 7 will carry this all-1 code regardless of the number of signals received after the counter has reached its capacity limit.

The full-count discriminator represented by gate DO allows us to use a counter having a capacity calculated on the basis of the duration of the longest signals to be evaluated, instead of a high-capacity counter able to measure very long signals before being automatically reset.

Figure 6:
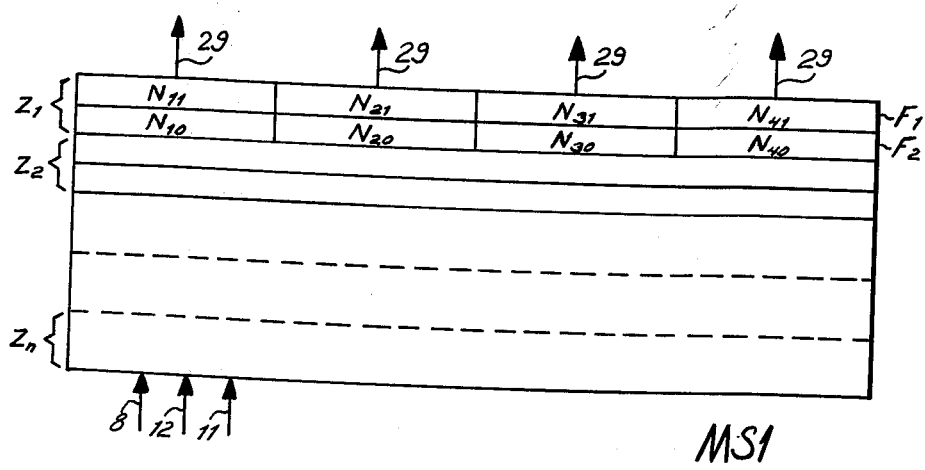
FIG. 6 is a detailed diagram of the circuit denoted by MS1 in FIG. 2.

FIG. 6 shows the structure of a section, for example MS1, of the read-only memory MS. This section comprises a certain number of areas denoted by Z1, Z2, . . . Zn; each area is addressed by a certain trunk code which may be accompanied by a modification code. Each area consists of two bands F1 and F2, each band being able to store permanently four binary numbers designated N11, N21, N31, N41 in band F1 and N10, N20, N30, N40 in band F2. Numbers N11, N21, N31, N41 of band F1 represent in binary code four different threshold levels of successive samples of one character, for example pulses or "on" signals; they are so chosen as to establish a certain progression of sample numbers depending on the trunk code allotted to the respective area. In the same way, numbers N10, N20, N30, N40 of band F2 represent in binary code four different threshold levels of successive samples of alternate character, for example pauses or "off" signals; they are chosen according to the criteria mentioned above in connection with band F1 numbers.

The stored threshold levels are measures for the minimum duration of a channel condition. The two sets of four numbers each may indicate equal or different durations for "on" and "off" signals, depending on the code. Known signaling codes utilize at least two possible durations for each channel condition; thus, storage of four duration thresholds enables the identification of signals in a four-threshold code or affords greater accuracy in determining the real duration of the channel conditions of a two- or three-threshold code.

Each signal reaching the memory MS (FIG. 2) on wire 8, 9 or 10 corresponding to a lead $\alpha$, $\beta$ or $\gamma$ enters the respective section MS1, MS2 or MS3 together with the trunk code and its accompanying modification code, if any, arriving at the three sections on wires 11, 12; within that section, one of the areas Z1 . . . Zn corresponding to the trunk-identification code and its possible modification code is addressed to read out a set of four binary numbers N11, N21, N31, N41 of band F1 if the input signal is a "1"; otherwise, if that signal is a "0", the set of four binary numbers N10, N20, N30, N40 of band F2 is read out. These sets of four numbers are compared in circuit CMP with the signals coming from counters CT, as described hereinafter.

The entire unit LRS operates as follows.

Signals appearing simultaneously on leads $\alpha$, $\beta$, $\gamma$, obtained by scanning trunks G1, G2, . . . Gn and by sampling the energy levels of their channels in unit CSC (FIG. 1), are sent on wires 13, 14, 15 (FIG. 2) to the three numerical integrators IN, which decode and integrate the respective signals as already described with reference to FIG. 4. After an initial transition period, upon the arrival of a sample, integrators IN recall from section SR of memory MG (FIG. 2), during the time slot $t_L$ (FIG. 3), on wires 4, 16, 17 (FIG. 2) the samples received from the same trunk during the previous cycle, and from section RI on wires 18, 19, 20 the states I, II, III, . . . X (FIG. 4) reached during that previous cycle; during the next time slot $t_E$ (FIG. 3) they process the newly arrived signals in the aforedescribed manner and during the time slot $t_S$ they send to section RI of memory MG (FIG. 2), on wires 18, 19, 20, the new state reached by each integrator. At the same time, wires 5, 21, 22 carry to counters CT the bits 0 or 1 generated by the decoders IN.

During the time slot $t_L$ (FIG. 3), counters CT recall from section SR of memory MG, on wires 4, 16, 17 (FIGS. 2 and 5), samples received from the same trunk during the previous cycle, and from section RCT on wires 3, 23, 24 the states reached by the same counters during the previous cycle; during the time slot $t_E$ (FIG. 3) they evaluate the incoming signals as already described with reference to FIG. 5 and during the time slot $t_S$ (FIG. 3) they send to register section RCT (FIG. 2) of memory MG the calculated total, through the multiples 6, 25, 26. This total is also sent, through the multiples 7, 27, 28, to the comparator CMP whose 12 subdivisions are connected to receive the four binary numbers of each section MS1, MS2, MS3 of memory MS: therefore, comparator CMP can be considered divided into 3 sections CMP1, CMP2, CMP3 of four subsections each. The numbers emitted on leads 7, 27, 28 from each one of the three counters CT are sent in parallel to the four subdivisions N1', N2', N3', N4' of each one of the three comparator sections CMP1,

CMP2, CMP3.

Signals outgoing from integrators IN reach also, via wires 8, 9, 10, sections MS1, MS2, MS3, respectively, of memory MS; these memory sections receive also, as already noted, the trunk code by way of connection 11 from section CD of memory MG and its modification code, if any, by way of connection 12 from section CV of that memory. With memory sections MS operating as previously described with reference to FIG. 6, the binary configurations corresponding to the thresholds indicating the duration of the channel conditions established by the detected code will appear on wires 29 according to the contents of band F1, if the integrator output is 1, or according to the contents of band F2, if that output is 0.

Component CMP then compares the numbers fed to subdivisions N1', N2', N3', N4' of each one of the three sections, coming from counter CT, with the numbers delivered via wires 29 from memory MS.

When the readings of the counters CT transmitted to comparator CMP are equal to the first threshold N1, wire 30 carries a signal "1" which is sent to the centralized processor AC: if a counter CT continues to receive input signals of the same type, the count will increase to the limit of its capacity and signal "1" will remain on wire 30 until the second threshold N2 is reached, resulting in the energization of wire 31, and so on up to the last threshold. The centralized processor AC will have information on the length of the signals present on the leads $\alpha$, $\beta$, $\gamma$.

The bits 1 or 0 generated in integrators IN, fed via wires 8, 9, 10 to the processor AC, assign the value "1" or "0" to the channel conditions whose durations are measured by the signals coming from comparator CMP; thus, processor AC has at its disposal the elements necessary for the next operation, such as criteria identification. The transmission of signals from comparator CMP to the processor AC may be accomplished through a simple direct connection such as wires 30, 31 etc. or through the intermediary of conventional priority encoders (not shown), one for each CMP section, transforming the set of four numbers outgoing from each one of sections CMP1, CMP2, CMP 3 into a triad of numbers indicating in an encoded way the threshold level N1, N2, N3 or N4 reached by the reading of counters CT.

The system here described is controlled by suitable timing units insuring proper synchronization with the sampling rhythm; these units, forming part of component CSC, have not been shown separately inasmuch as they are well known to persons skilled in the art. For the same reason we have not illustrated specific circuitry for carrying out the feeding to and the recall from memory MG of the signals resulting from the operations performed by integrators IN and counters CT, and the transfer of data from memory MG to memory MS.

Various modifications and adaptations of the disclosed arrangement may be introduced without departing from the spirit and scope of our invention as defined in the appended claims.

What we claim is:

1. In a central office of a telecommunication system serving a multiplicity of incoming lines each constituted by a plurality of channels carrying binary switching criteria represented by alternating channel conditions, said lines being identified by individual codes, in combination:

timing means establishing a recurrent sampling cycle;
   first register means controlled by said timing means for successively reading out the identification codes of said incoming lines during respective sampling intervals within each cycle;
   decoding means controlled by said timing means and connected to said incoming lines for generating a bit for each channel of an incoming line during a sampling interval allocated thereto;
   memory means storing at least one threshold value for the minimum length of each of two binary channel conditions for each channel of each of said incoming lines, said memory means being controlled by said timing means for giving out the threshold values of the several channels of any incoming line whose identification code is read out from said first register means during a sampling interval;
   second register means connected to said decoding means for temporarily storing, for the duration of a sampling cycle, a bit generated during any of said sampling intervals;
   coincidence means connected to said second register means and to said decoding means for determining therefrom the identity or nonidentity of a stored bit from a preceding sampling cycle with a newly generated bit;
   counting means for each channel of an incoming line connected to said coincidence means for resetting in response to a determination of nonidentity, and for producing a progressively increasing count until reset;
   comparison means connected to said counting means and to said memory means for comparing during each sampling interval the count from said counting means with said threshold value for each channel of the incoming line being sampled; and
   processing means for carrying out switching operations under the control of said comparison means.

2. In a central office of a telecommunication system serving a multiplicity of incoming lines each constituted by a plurality of channels carrying binary switching criteria represented by alternating first and second channel conditions, said lines being identified by individual codes, in combination:

timing means establishing a recurrent sampling cycle;
   first register means controlled by said timing means for successively reading out the identification codes of said incoming lines during respective sampling intervals within each cycle;
   decoding means controlled by said timing means and connected to said incoming lines for generating a bit for each channel of an incoming line during a sampling interval allocated thereto;
   second register means connected to said decoding means for temporarily storing, for the duration of a sampling cycle, a bit generated during any of said sampling intervals;
   coincidence means connected to said second register means and to said decoding means for determining therefrom the identity or nonidentity of a stored bit from a preceding sampling cycle with a newly generated bit;
   counting means for each channel of an incoming line connected to said coincidence means for producing a count of successive sampling cycles during which identical bits are generated by said decoding means, said counting means including zeroizing means for restarting the count thereof under the control of said coincidence means upon a determination of nonidentity between successively generated bits; and processing means connected to said decoding means and to said counting means for carrying out switching operations in response to said bit and to a measure of the duration of the channel condition represented by said bit.

3. The combination defined in claim 2 wherein said decoding means is programmed to change from a first stable state to a second stable state by way of a plurality of intermediate first transitory states in response to recurrent samples indicative of said second channel condition, with retrogression to an earlier state from any of said first transitory states in response to a sample indicative of said first channel condition, and to change from said second stable state to said first stable state by way of a plurality of intermediate second transitory states in response to recurrent samples indicative of said first channel condition, with retrogression to an earlier state from any of said second transitory states in response to a sample indicative of said second channel condition.

4. The combination defined in claim 2 wherein said counting means comprises an arithmetic unit with input and output multiples extending to said first register means for storing the count thereof in said first register means for one sampling cycle and incrementing the stored count on each successive sampling cycle, said zeroizing means including gating means in said output multiple for blocking the output of said arithmetic unit with consequent recirculation of a zero count via said first register means.

5. The combination defined in claim 4 wherein said arithmetic unit has a predetermined counting capacity, further comprising discriminating means connected to said input multiple in parallel with said arithmetic unit for operating said gating means in the presence of a full-capacity count to recirculate said count indefinitely in the absence of a nonidentity determination by said coincidence means.

6. The combination defined in claim 2, further comprising memory means storing at least one threshold value for the minimum length of each of said channel conditions for each channel of each of said incoming lines, said memory means being controlled by said timing means for giving out the threshold values of the several channels of any incoming line whose address is read out from said first register means during a sampling interval, the connection between said processing means and said counting means including comparison means for comparing during each sampling interval the count from said counting means with said threshold value for each channel of the incoming line being sampled.

7. The combination defined in claim 6 wherein said memory means is a programmable read-only memory with a plurality of areas respectively assigned to said incoming lines, each area being divided into a first band for the storage of threshold values relating to said first channel conditions and a second band for the storage of threshold values relating to said second channel condition.

* * * * *